United States Patent
Fowler et al.

(10) Patent No.: US 8,032,031 B2
(45) Date of Patent: Oct. 4, 2011

(54) FIBER OPTIC GPS LINK

(75) Inventors: Clarence W. Fowler, Elgin, TX (US); Michael L. Hillmann, St. Charles, MO (US); Kevin J. Kline, St. Charles, MO (US); John J. Gaubatz, Troy, IL (US); Darren W. Hacker, St. Louis, MO (US)

(73) Assignee: Raven Industries, Inc., Sioux Falls, SD (US)

( * ) Notice: Subject to any disclaimer, the term of this patent is extended or adjusted under 35 U.S.C. 154(b) by 573 days.

(21) Appl. No.: 12/236,179

(22) Filed: Sep. 23, 2008

(65) Prior Publication Data

US 2009/0080899 A1    Mar. 26, 2009

Related U.S. Application Data

(60) Provisional application No. 60/975,067, filed on Sep. 25, 2007.

(51) Int. Cl.
*H04B 10/00* (2006.01)
(52) U.S. Cl. ......... 398/140; 398/118; 398/138; 398/142
(58) Field of Classification Search .................. 398/118, 398/138, 140
See application file for complete search history.

(56) References Cited

U.S. PATENT DOCUMENTS

| | | | |
|---|---|---|---|
| 6,747,794 B2 | 6/2004 | Wang | |
| 2004/0228588 A1* | 11/2004 | Eldring et al. | 385/94 |
| 2005/0063712 A1 | 3/2005 | Rice et al. | |

FOREIGN PATENT DOCUMENTS

| | | |
|---|---|---|
| WO | WO03/081810 | 10/2003 |
| WO | WO 03/081810 | * 10/2003 |
| WO | WO2006/137904 | 12/2006 |
| WO | WO 2006/137904 | * 12/2006 |

* cited by examiner

*Primary Examiner* — Dung Nguyen
(74) *Attorney, Agent, or Firm* — Altera Law Group, LLC

(57) ABSTRACT

A fiber optic GPS signal device and method comprising a VCSEL multimode transmitter having a gain that, together with the GPS antenna gain, is greater than the VCSEL multimode transmitter noise. When in operative communication, via a long length of multimode fiber, i.e., up to 2000 feet and greater, with a fiber optic receiver, the GPS signals are transmitted at, inter alia, L1 and L2 frequencies with minimal degradation over the length of multimode fiber. The present invention may be used in a variety of GPS transmission applications requiring long lengths of cabling. For example, the invention is particularly useful when the GPS antenna is located on top of an office building or cell phone tower and remotely from the GPS receiver and for use in high-volume commercial telephone synchronizing (DTMF) applications.

17 Claims, 1 Drawing Sheet

FIBER OPTIC GPS LINK

CROSS-REFERENCE TO RELATED APPLICATIONS

The present application claims priority to provisional application No. 60/975,067, filed on Sep. 25, 2007, the entire contents of which are incorporated herein by reference

FIELD OF THE INVENTION

This invention relates generally to an apparatus, system and method for transmitting Global Positioning System (GPS) signals over multimode fiber.

BACKGROUND OF THE PRESENT INVENTION

Certain applications for Global Positioning System (GPS) receivers require the receiver to be placed a thousand feet or more from the antenna. One such application is the use of GPS timing receivers for time synchronization and frequency control in telephone networks. This application of GPS timing receivers may require the antenna to be placed atop a large office building and routing a coaxial cable through the building to the telephone network control room where the GPS receiver is located. The losses in standard low cost coaxial cable will be between 10 dB and 30 dB per 100 feet at 1.57542 GHz. It is well known that losses in coaxial cable increase with frequency. For example, RG58C coaxial cable is listed in Buchsbaum's Handbook of Practical Electronics as having 1.6 dB of loss per 100 feet at 10 MHz and 24 dB per 100 feet at 1 GHz. Coaxial cable losses have been dealt with in the past in at least three ways.

The first approach involves the placement of a Low Noise Amplifier (LNA) at the antenna with enough gain to overcome the cable losses. However at GPS frequencies, this approach is useful only for cable lengths up to about 200 feet.

The second approach utilizes Low Noise Block (LNB) down conversion to a lower frequency at the antenna and transferring the signal at a lower frequency over a coaxial cable to a receiver designed to accept the lower frequency. This approach is not suitable for GPS receivers which are designed to receive the 1.57542 GHz signal. Nor is it a cost-effective solution to redesign the GPS receiver to accept a lower frequency signal.

The third approach seeks to deal with coaxial cable losses in a third way by using a down-converter section at the antenna and an up-converter section at the receiver to convert the signal back to the original frequency received at the antenna as is described in U.S. Pat. No. 5,999,795, with common inventorship and assignment as the present invention, the disclosure of which is hereby incorporated in its entirety. Briefly summarized, this invention prevents the introduction of frequency errors, a reference signal is transmitted along the cable and is used in both the up-conversion and down-conversion processes. Thus, a received signal at a frequency too high to be transmitted along a length of cable without appreciable loss in amplitude is down-converted to a lower frequency. The down-conversion process comprises mixing the received signal with a local oscillator signal to produce an intermediate frequency. The intermediate frequency is transmitted down the length of cable. The intermediate frequency is selected to be much lower than the frequency of the received signal. Since signal attenuation along the cable decreases as frequency decreases, the lower frequency intermediate signal will experience lower loss than would the higher frequency received signal. At the opposite end of the cable, the intermediate signal is up-converted to a higher frequency output signal. The up-conversion process is accomplished by mixing the intermediate signal with a local oscillator signal. The local oscillator signals in both the up-converter and down-converter are derived from the same reference signal. For GPS applications, a GPS signal at a frequency of 1.57542 GHz is received by an antenna and enters a converter where it is subtracted from 1.6368 GHz to yield a 61.38 MHz intermediate frequency. The intermediate frequency is amplified and enters a diplexer. The diplexer is an arrangement of a two-way power-splitter and filters that isolate the 61.38 MHz intermediate frequency and the 16.368 MHz reference frequency, thus allowing the coaxial cable to transfer both signals simultaneously. The intermediate frequency arrives at the diplexer on the receiving end of the coaxial cable and is directed to a converter where it is mixed with the 1.6368 GHz local oscillator (LO) signal to reproduce the signal at 1.57542 GHz. The output of the converter is then filtered and attenuated to a signal level that is representative of a signal received by an active GPS antenna with a gain of 30 dB. The GPS receiver connected to the output of the up-converter sees the signal as if it were connected to a standard active GPS antenna. This is a workable solution, but is too complex to allow addition of other frequencies into the same cable or fiber.

In addition, Radio Frequency fiber optic links now in use assume the need for high dynamic range. The assumption underlying these devices is that general purpose link will experience signals that range over a dynamic range of 60 dB or more, thus implying a signal power range of from about 0 dBm to −60 dBm. Adherence to this assumption causes existing devices to be very expensive. The expense derives, in part, from costs associated with special low noise linear modulators and detectors.

Thus, a need still exists for an inexpensive method and apparatus for transmitting GPS signals at L1 (1575.42 MHz) and/or L2 (1227.6 MHz) frequencies, as well as any frequency between 800 MHz and 1800 MHz down a long length, e.g., up to 2000 feet or longer, of fiber optic cable to the GPS receiver.

SUMMARY OF THE INVENTION

A fiber optic GPS signal device and method comprising a VCSEL multimode transmitter having a gain that, together with the GPS antenna gain, is greater than the VCSEL multimode transmitter noise. When in operative communication, via a long length of multimode fiber, i.e., up to 2000 feet and greater, with a fiber optic receiver, the GPS signals are transmitted at, inter alia, L1 and L2 frequencies with minimal degradation over the length of multimode fiber. The present invention may be used in a variety of GPS transmission applications requiring long lengths of cabling. For example, the invention is particularly useful when the GPS antenna is located on top of an office building or cell phone tower and remotely from the GPS receiver and for use in high-volume commercial telephone synchronizing (DTMF) applications.

The foregoing will become apparent to those skilled in the art when the following detailed description of the invention is read in conjunction with the accompanying drawings and claims. Throughout the drawings, like numerals refer to similar or identical parts.

DETAILED DESCRIPTION OF THE INVENTION

Figure 1:
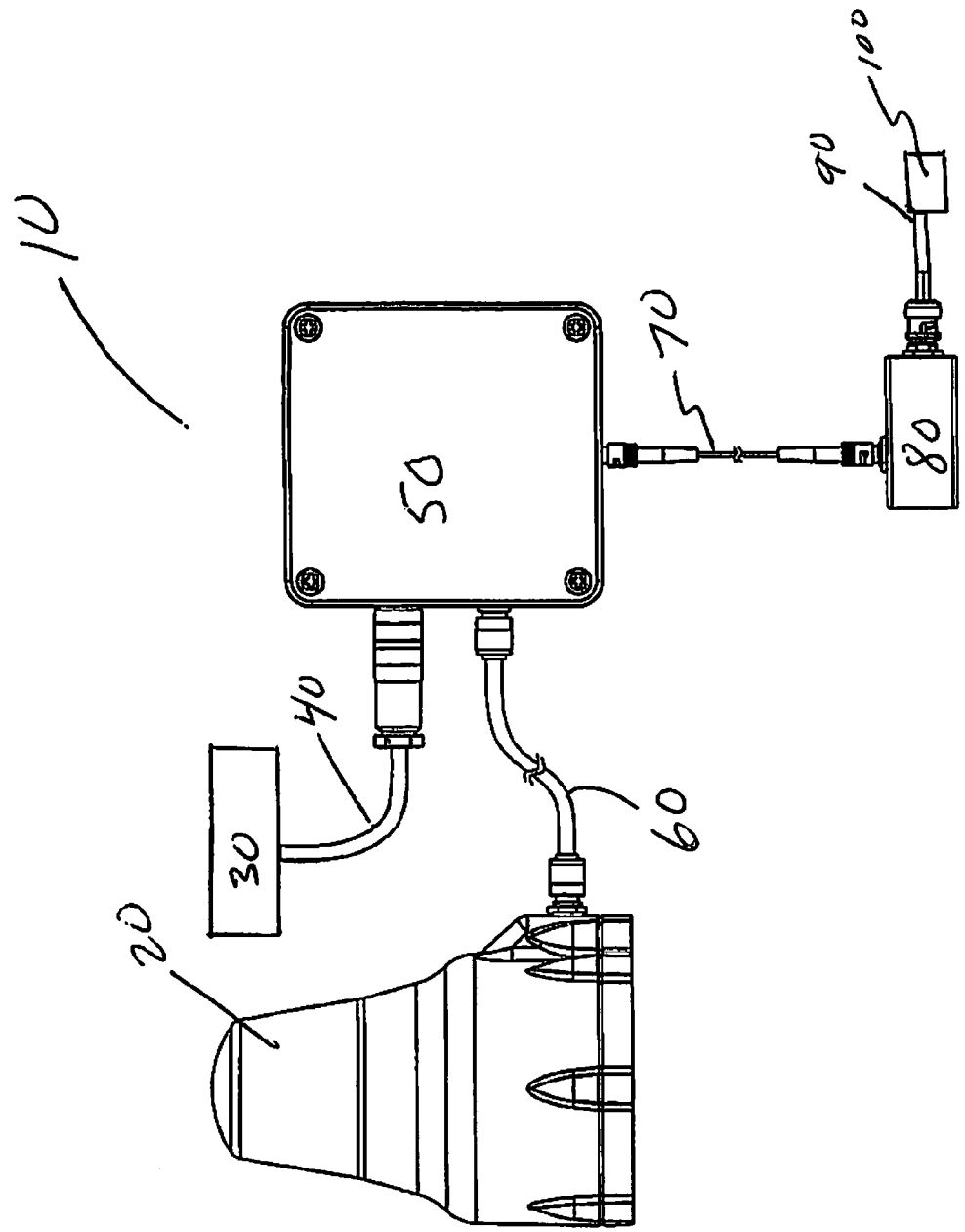
FIG. 1 is a system level diagram of one embodiment of the present invention.

With reference to the accompanying FIGURE, there is provided a device and method for transmitting GPS signals at L1 (1575.42 MHz) and/or L2 (1227.6 MHz) frequencies, as well as any frequency between 800 MHz and 1800 MHz down a long length, e.g., up to 2000 feet or more, of fiber optic cable to the GPS receiver.

As discussed briefly above, GPS signals do not have a high dynamic range. In other words, the GPS signals are small, e.g., −120 dBm to −130 dBm, and do not vary more than about 12 dB. This is due, in part, to the fact that all relevant satellites are orbiting at an altitude of 12,500 miles and have the same signal strengths as well as approximately equivalent distances from the GPS receivers located on earth. These signal strength variations are mainly due to antenna patters at the receiver end of the GPS links. Good GPS receiving antennas have a patter that is about 6 dB of signal level variation over the hemispheric reception patter above 10 degrees of elevation. Losses due to propagation of the GPS signals through the atmosphere cause about another 6 dB of signal loss. Thus, GPS signals require a dynamic range of about 12 dB.

This very small dynamic range of about 12 dB for GPS signals allows the incorporation and use of inexpensive Vertical Cavity Surface Emitting Laser (VCSEL) fiber optic compatible transmitters in the present invention to provide low-cost GPS fiber link applications such as in high-volume time synchronization and frequency control in telephone networks, i.e., DTMF.

The VCSEL multimode transmitter as employed in the present invention are known in the art and are currently commercially available from such vendors as Honeywell and Vitesse. Such VCSEL multimode transmitters comprise a laser designed to drive low-cost multimode fiber and are capable of linear modulation to 2.5 GHz at 850 nm wavelength, i.e., at the low end of the visible red light spectrum. In general, VCSEL transmitters have poor noise performance with noise figures of 50 dB, as opposed to a low-noise amplifier which may have noise figures as low as 1 dB. Further, such VCSEL transmitters comprise limits on low temperature operation, i.e., they must be operated at or above 9 degrees Celsius for proper function. As a result of these performance issues, VCSEL transmitters are not an obvious choice for GPS signal transmission.

Further, multimode fiber comprises a bandwidth specified at less than 1 GHz. Therefore, multimode fiber appears unsuitable for GPS signals which currently comprise L1 (1575.42 MHz) and L2 (1227.6 MHz) frequencies over long-range distances of up to 2000 feet and more. Because the multimode fiber bandwidth is specified for digital data, comprised of 1's and 0's, and the multimode fiber comprises different modulation frequencies, the waveforms would likely be distorted with increased fiber length. These factors, inter alia, combine to render multimode fiber unobvious choice for GPS signal transmission.

However, we have determined that the delay distortion does not degrade the relatively narrowband GPS signal. Several other GPS frequencies are contemplated for GPS satellites, the present invention is capable of addressing any frequency between 800 MHz and 1.8 GHz. In addition, we have suppressed the approximately 50 dB noise of the VCSEL transmitter by gain.

With specific reference to FIG. 1, one embodiment of the present invention 10 is provided. Thus, a GPS antenna 20, as is well known in the art, is provided. Such GPS antennae 20 are capable of receiving GPS signals of a very low level (−120 dBm to −130 dBm) and have a normal gain of 26 dB. The GPS antenna 20 is illustrated as operatively connected to a fiber optic transmitter 50 by a standard 50Ω coaxial cable 60. The fiber optic transmitter 50 comprises a VCSEL multimode transmitter not shown but as is well known in the art. The VCSEL multimode transmitter comprises a laser to facilitate transmission of the GPS signals. The VCSEL multimode transmitter is operatively connected with a power supply 30 via standard cabling 40 as is well known in the art. In turn, the fiber optic transmitter 50 comprising the VCSEL multimode transmitter is in operative communication via multimode fiber optic cable 70 to a fiber optic receiver 80 which is in operative communication with at least one GPS receiver 100 by, e.g., a standard 50Ω coaxial cable 90. The multimode fiber optic cable 70 operatively connecting the fiber optic transmitter 50 and fiber optic receiver 80 may comprise a length of up to 2000 feet or longer, depending on the particular job at hand.

Using this arrangement, we amplify the GPS signals coming from the GPS antenna 20, which by itself comprises a gain of about 26 dB to about 32 dB, by an additional about 28 dB to about 32 dB to yield a total gain of approximately 60 dB in order to overcome the 50 dB noise figure of the VCSEL multimode transmitter of the fiber optic transmitter 50, thus producing a low cost GPS fiber optic link. The amplification within the VCSEL multimode transmitter is achieved by, as is well known to the skilled artisan, specifying a gain for that is above the noise figure of the VCSEL transmitter. Thus, the VCSEL multimode transmitter comprises an amplifier (not shown, but as is well understood in the art) for which gain may be specified. The gain specification for the VCSEL transmitter amplifier may comprise different levels depending on the actual gain required to overcome the noise of the VCSEL transmitter and in view of the actual gain of the GPS antenna which may vary between about 26 dB to about 32 dB. An increase in total gain achieved between the GPS antenna and VCSEL gain of 10 dB over the VCSEL multimode transmitter noise level is preferred, though other total gain increases, including more than or less than 10 dB, over the VCSEL multimode transmitter noise are well within the scope of the invention By way of example and without limitation, the amplification of the GPS signals by 60 dB in total means that the noise from the antenna 20 exceeds the noise power from the VCSEL transmitter's laser of the fiber optic transmitter 50 by 10 dB. This, in turn, means that the noise from the GPS antenna 20 exceeds the laser noise by 10 times. As a result, the GPS signals are transmitted through the fiber link of the present invention and to the at least one GPS receiver 100 without degradation. In addition, since the operative wavelength of the fiber optic transmitter 50 comprising a VCSEL multimode transmitter is 850 nm and at the low end of the visible red light spectrum, low cost multimode fiber optic cable 70 may be used with lengths up to 2000 feet or longer without performance degradation.

Since the VCSEL transmitter of the fiber optic transmitter 50 has a low temperature operational limit of less than 9 degrees Celsius, the VCSEL multimode transmitter, specifically the laser body of the VCSEL multimode transmitter, is operationally connected with a heat conductive plate as is known in the art. The laser body is in operative connection with the VCSEL multimode transmitter's amplifier. The temperature of the heat conductive plate is monitored and not allowed to go below 9 degrees Celsius.

A method according to the present invention may comprise:
A method for transmitting GPS signals over multimode fiber, comprising:
    providing a GPS antenna having a specified gain;

providing a fiber optic transmitter comprising a VCSEL multimode transmitter having a specified noise level and operatively connecting the GPS antenna with the fiber optic transmitter;

providing an amplifier comprising a specifiable gain in the fiber optic transmitter;

ensuring the total gain comprising the GPS antenna gain plus the specified amplifier gain is greater than the VCSEL multimode transmitter's noise level;

connecting the fiber optic transmitter with a fiber optic receiver with a length of multimode fiber;

operatively connecting the fiber optic receiver with at least one GPS receiver;

receiving GPS signals with the GPS antenna;

transmitting the GPS signals from the GPS antenna to the fiber optic transmitter;

amplifying the GPS signals to the specified gain;

transmitting the amplified GPS signals to the fiber optic receiver;

and transmitting the amplified GPS signals to the at least one GPS receiver.

Additional method steps may comprise maintaining the multimode VCSEL transmitter laser at a temperature of at least 9 degrees Celsius.

The above specification describes certain preferred embodiments of this invention. This specification is in no way intended to limit the scope of the claims. Other modifications, alterations, or substitutions may now suggest themselves to those skilled in the art, all of which are within the spirit and scope of the present invention. It is therefore intended that the present invention be limited only by the scope of the attached claims below.

What is claimed is:

1. An apparatus for transmitting GPS signals at L1 (1575.42 MHz) and/or L2 (1227.6 MHz) frequencies over multimode fiber, the GPS signals received from a GPS antenna having a gain, the apparatus comprising:
    a fiber optic transmitter, the fiber optic transmitter in operative communication with the GPS antenna and comprising a VCSEL multimode transmitter comprising a noise level, a laser body and an amplifier with specifiable gain in operative connection with the laser body;
    multimode fiber cable in operative communication with the fiber optic transmitter and having a length;
    a fiber optic receiver in operative communication with the multimode fiber cable; and
    at least one GPS receiver in operative communication with the fiber optic receiver.

2. The apparatus of claim 1, further comprising a total gain comprised of the specifiable gain of the amplifier and the GPS antenna gain.

3. The apparatus of claim 2, further comprising the total gain being larger than the noise level of the VCSEL multimode transmitter.

4. The apparatus of claim 1, wherein the length of multimode fiber cable comprises up to 2,000 feet.

5. The apparatus of claim 4, wherein the length of multimode fiber cable is greater than 2,000 feet.

6. The apparatus of claim 3, further comprising the total gain is 10 dB larger than the noise level of the VCSEL multimode transmitter.

7. The apparatus of claim 3, further comprising the total gain being less than 10 dB larger than the noise level of the VCSEL multimode transmitter.

8. The apparatus of claim 3, further comprising the total gain being greater than 10 dB larger than the noise level of the VCSEL multimode transmitter.

9. The apparatus of claim 1, further comprising the GPS signals having a frequency between 800 MHz and 1800 MHz.

10. The apparatus of claim 1, further comprising a heat conductive plate in operative connection with the VCSEL multimode transmitter laser body.

11. An apparatus for transmitting GPS signals at L1 (1575.42 MHz) and/or L2 (1227.6 MHz) frequencies over multimode fiber, the GPS signals received from a GPS antenna having a gain, the apparatus comprising:
    a fiber optic transmitter, the fiber optic transmitter in operative communication with the GPS antenna and comprising a VCSEL multimode transmitter comprising a noise level, a laser body and an amplifier with specifiable gain in operational communication with the laser body;
    multimode fiber cable in operative communication with the fiber optic transmitter and having a length;
    a fiber optic receiver in operative communication with the multimode fiber cable;
    at least one GPS receiver in operative communication with the fiber optic receiver;
    a total gain comprised of the specifiable gain of the amplifier and the GPS antenna gain; and
    a heat conductive plate in operative connection with the VCSEL multimode transmitter laser body.

12. The apparatus of claim 10, further comprising the GPS signals having a frequency between 800 MHz and 1800 MHz.

13. A method for transmitting GPS signals over multimode fiber, comprising:
    providing a GPS antenna having a specified gain;
    providing a fiber optic transmitter comprising a VCSEL multimode transmitter having a laser and specified noise level and operatively connecting the GPS antenna with the fiber optic transmitter;
    providing an amplifier comprising a specifiable gain in the fiber optic transmitter;
    ensuring the total gain comprising the GPS antenna gain plus the specified amplifier gain is greater than the VCSEL multimode transmitter's noise level;
    connecting the fiber optic transmitter with a fiber optic receiver with a length of multimode fiber;
    operatively connecting the fiber optic receiver with at least one GPS receiver;
    receiving GPS signals at L1 (1575.42 MHz) and/or L2 (1227.6 MHz) frequencies with the GPS antenna;
    transmitting the GPS signals from the GPS antenna to the fiber optic transmitter;
    amplifying the GPS signals to the specified gain;
    transmitting the amplified GPS signals to the fiber optic receiver;
    and transmitting the amplified GPS signals to the at least one GPS receiver.

14. The method of claim 12, further comprising ensuring the total gain exceeds the VCSEL multimode transmitter's noise level by at least 10 dB.

15. The method of claim 12, further comprising ensuring that the total gain exceeds the VCSEL multimode transmitter's noise level by up to 10 dB.

16. The method of claim 12, further comprising maintaining the multimode VCSEL transmitter's laser at a temperature of at least 9 degrees Celsius.

17. The method of claim 12, further comprising receiving the GPS signals at any frequency between 800 MHz and 1800 MHz with the GPS antenna.

* * * * *